United States Patent

Courson

[15] 3,667,603

[45] June 6, 1972

[54] HYDRAULIC MANIFOLD SYSTEM

[72] Inventor: Richard B. Courson, Warren, Mich.

[73] Assignee: Almo Manifold and Tool Company, Center Line, Mich.

[22] Filed: June 8, 1970

[21] Appl. No.: 44,231

Related U.S. Application Data

[63] Continuation-in-part of Ser. No. 758,338, Sept. 9, 1968, abandoned.

[52] U.S. Cl. .............................................. 210/130, 210/167
[51] Int. Cl. .................................. B01d 35/14, B01d 35/02
[58] Field of Search .................. 137/544, 545, 549; 210/130, 210/133, 152, 167, 168, 171, 251, 416, 418, 432

[56] References Cited

UNITED STATES PATENTS

| | | | |
|---|---|---|---|
| 1,948,479 | 2/1934 | Caminez | 210/168 X |
| 2,016,541 | 10/1935 | Campbell | 210/130 X |
| 1,984,459 | 12/1934 | Campbell et al. | 137/545 X |
| 1,711,779 | 5/1929 | Farmer | 137/544 X |

Primary Examiner—Frank A. Spear, Jr.
Attorney—William L. Fisher

[57] ABSTRACT

A hydraulic manifold system is disclosed comprising, in combination, a hydraulic manifold having a liquid-directing hydraulic circuit therein, liquid filter means associated with said hydraulic manifold for filtering hydraulic liquid entering a part of said hydraulic circuit, and by-pass means including a uni-directional check valve associated with said filter means operative upon clogging of the filtering action thereof, each said hydraulic manifold, filter means and by-pass means itself consisting of no pipes, said filter means comprising a filter cavity having inlet and outlet liquid passage means therefor and constructed to receive within itself and to seal against a replaceable liquid filter cartridge disposed in said filter cavity, said hydraulic manifold having means for mounting thereon at least one hydraulic liquid flow-control valve, said hydraulic circuit comprising inlet and outlet ports in said hydraulic manifold for hydraulic liquid, respectively, entering and leaving the latter, a pair of control ports in said hydraulic manifold for said flow-control valve for hydraulic liquid, respectively, entering and leaving said flow-control valve, and liquid passage means for directing hydraulic liquid from said filter cavity outlet liquid passage means to one of said control ports and from the other of said control ports to said hydraulic manifold outlet port, said filter cavity inlet and outlet liquid passage means in communication, respectively, with said hydraulic manifold inlet port and said one control port, said check valve having inlet and outlet liquid passage means therefor in communication, respectively, with said filter cavity and said one control port and constructed to open in the event of clogging of the filtering action to by-pass hydraulic liquid around said filter cartridge from said hydraulic manifold inlet port through said check valve to said one control port.

6 Claims, 7 Drawing Figures

INVENTOR.
Richard B. Courson
BY William L. Fisher Esq.
HIS ATTORNEY

INVENTOR.
Richard B. Courson
BY William L. Fisher Esq.
HIS ATTORNEY

HYDRAULIC MANIFOLD SYSTEM

This application is a continuation in part of my copending application Ser. No. 758,338 filed Sept. 9, 1968, now abandoned.

My invention relates to hydraulic manifolds.

The principal object of my invention is the provision of a hydraulic manifold system which filters hydraulic oil entering the hydraulic circuit of a hydraulic manifold.

The foregoing object of my invention and the advantages thereof will become apparent during the course of the following description, taken in conjunction with the accompanying drawings in which FIG. 1 is a top plan view of a hydraulic manifold system embodying my invention;

Figure 1:
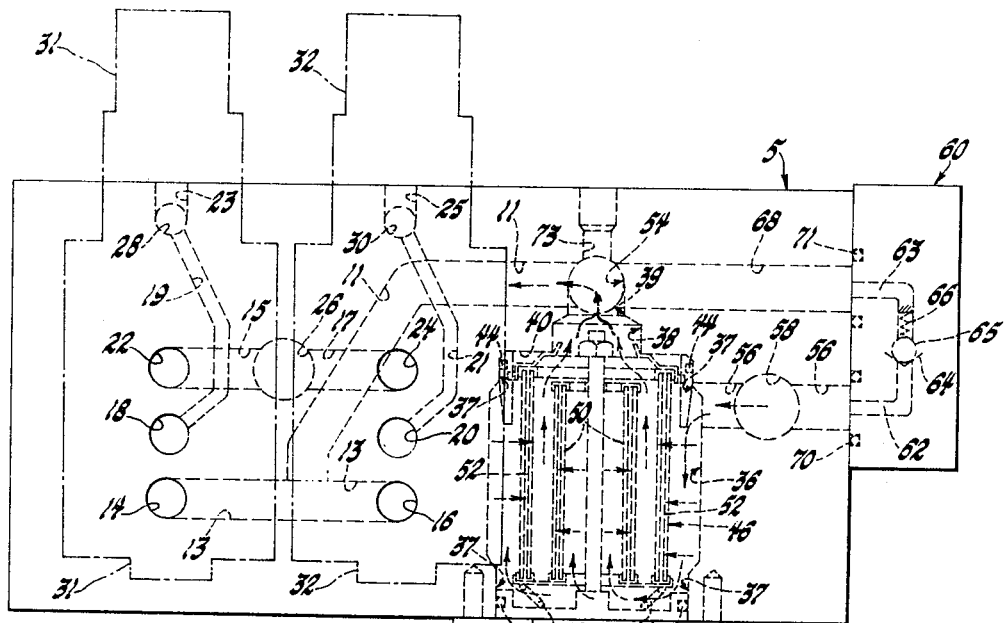
Figure 4:
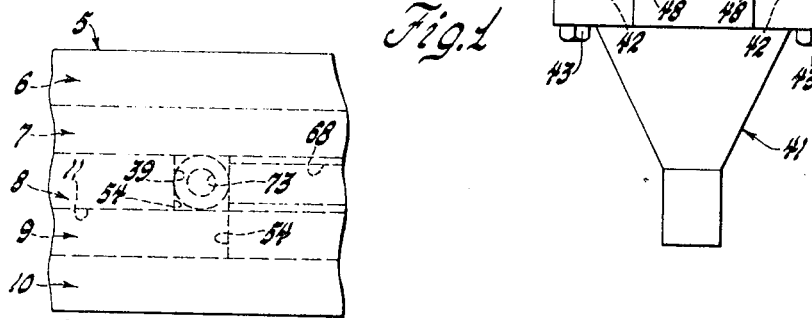
FIG. 4 is a fragmentary front elevational view of a portion of said embodiment.
Figure 2:
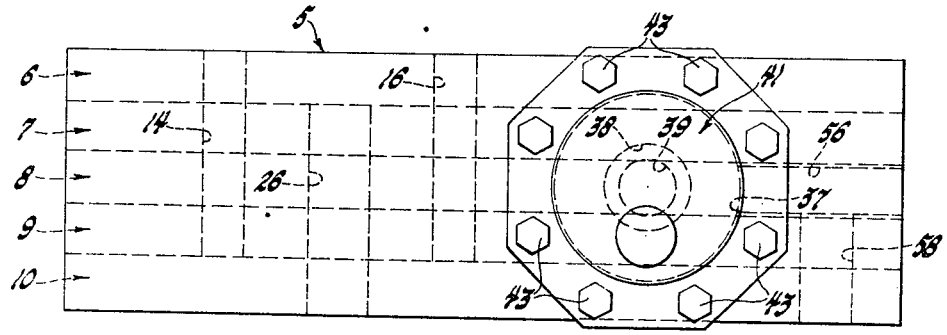
FIGS. 2 and 3 are, respectively, front and end elevational views thereof with different parts removed.
Figure 3:
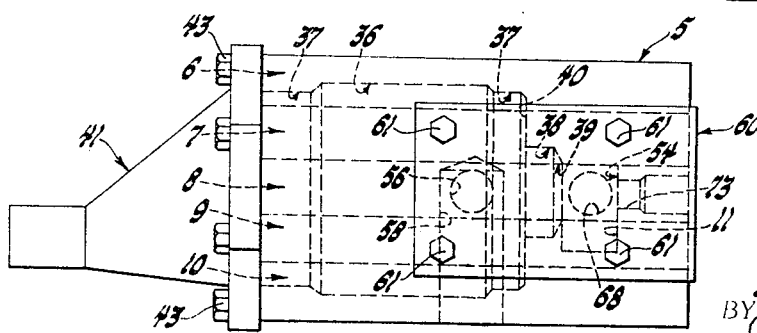

Referring to the drawings in greater detail and first to FIGS. 1–4, the hydraulic manifold system shown therein is designated 5 and comprises, in combination, a hydraulic manifold having an oil directing hydraulic circuit therein commencing with oil passage means 11, oil filter means for filtering hydraulic oil entering said hydraulic circuit, and by-pass valve means 60 operative to by-pass the filtering action in the event of clogging thereof. Said hydraulic manifold, in the instance, is a brazed hydraulic manifold consisting of at least two metal plates and, in the instance, five metal plates 6–10 brazed together face to face.

The filter means comprises metal body housing means having filter cavity means, generally designated 36, therein. Said housing means which, in the instance, is integral with said hydraulic manifold has opposite front and back faces and a side face to which said by-pass valve 60 means is bolted.

Said filter cavity means 36 has its axis transversely disposed in respect to the length of the hydraulic manifold and opens to and extends inwardly from said front face of said housing means and is defined by concentric apertures 37, 38 and 39 and the shoulder 40 between said apertures 37 and 38. Said filter cavity means 36 is constructed to seal against replaceable filter cartridge means 41 having a throwaway filter cartridge 46 consisting of filter cartridge elements 50 and 52 disposed therein so as to divide said filter cavity means 36 into filtered and unfiltered hydraulic oil zones. Said filter cartridge means 41 carries O-ring seals 42 and 44 which seal against the bore 37. The cartridge 46 is spring pressed by spring means 48 against the shoulder 40. The filter cartridge 46 is insertable into and removable from said filter cavity means 36 through said opening therefor flush with said front face of said housing means. Said front face of said housing means serves as a mounting means by which said filter cartridge means 41 may be bolted, as at 43, to said housing means. Said filter cavity means 36 and said housing means have communicating entry port means by which hydraulic oil entering said housing means enters said filter cavity means 36 before reaching said hydraulic circuit. In the instance, intersecting oil passage means 56 and 58 form entry port means for said filter cavity means 36 and for said housing means. Said filter cavity means 36 has exit port means consisting of the bore 39 and interconnecting oil passage means 54. The interconnecting oil passage means 54 communicates said oil passage means 11 with the filtered hydraulic oil zone of said filter cavity means 36 so that filtered hydraulic oil leaving said filter cavity means 36 enters said hydraulic circuit. Said filter cavity means comprises clean-out oil passage means 73 which is normally plugged at its outer end and opens to said rear face of said housing means and serves as a means to back-wash the filter cartridge 46. Said filter means also comprises by-pass oil passage means 56 and 68 which open to said side face of said housing means and communicate entry and exit port means 62 and 63 of said by-pass valve means 60, respectively, with the unfiltered hydraulic oil zone of said filter cavity means 36 and with said interconnecting oil passage means 54 so that in the event of clogging of the filtering action unfiltered hydraulic oil in said filter cavity means 36 can by-pass the filter cartridge 46 and reach the exit port means of said filter cavity means 36 via said by-pass valve means 60.

Said by-pass valve means 60 includes a valve seat 64 and a moveable valve spool 65 (shown by convention as a ball) spring pressed, as by spring means 66, against said valve seat 64 and O-ring seals 70 and 71 for sealing, respectively, about said entry and exit port means 62 and 63 in respect to said side face of said housing means.

In constructing said hydraulic manifold system 5, a part of said hydraulic circuit is formed in said manifold prior to brazing. Oil passage means 54 is drilled through plates 8 and 9 prior to brazing as are oil passage means 28 and 30 drilled through plate 7. Said oil passage means 11 and oil passage means 13 and 15 are cut in plate 9 and oil passage means 17, 19 and 21 are cut in plate 7 prior to brazing. The cut oil passage means 11, 13, 15, 17, 19 and 21 are straight walled passageways from being cut rather than drilled. The other part of said hydraulic circuit is formed subsequent to brazing. Oil passage means 18 and 20 are drilled clear through said hydraulic manifold from the bottom to the top faces thereof; oil passage means 14, 16 and 22 are drilled inwardly from the top face of the hydraulic manifold through plates 6–9; oil passage means 24 are drilled inwardly from the top face of the hydraulic manifold through plates 6 and 7; oil passage means 26 are drilled inwardly from the bottom face of said hydraulic manifold through plates 10– 7; and oil passage means 23 and 25 are drilled inwardly from the rear face of the hydraulic manifold so as to communicate, respectively, with said oil passage means 28 and 30. Said oil passage means 23 and 25 which are normally plugged at the outer ends thereof give access, e.g., for test purposes, to the hydraulic oil flowing between the hydraulic manifold and the pair of work devices. Said filter cavity means 36, in the instance, is also formed subsequent to brazing by machining said concentric apertures 37, 38 and 39 inwardly from the front face of said housing means. The aperture 39 is made to intersect with said oil passage means 54 as is said clean-out oil passage means 73 which is drilled inwardly from the back face of said housing means. Subsequent to forming said filter cavity means 36 oil passage means 56 and 68 are drilled inwardly from said side face of said housing means to intersect, respectively, with said filter cavity means 36 and said oil passage means 54. The entry port means 58 for said hydraulic manifold is drilled inwardly from the bottom face of said housing means into plates 10–8 to intersect with said oil passage means 56. A pair of valves 31 and 32 (shown in dash dot lines in FIG. 1 only) are mounted on the top face of said hydraulic manifold and control a pair of hydraulic work devices (not shown) remote from the hydraulic manifold system 5. The inlet ports of the valves 31 and 32 are in communication with the oil passage means 14 and 16; the outlet ports of the valves 31 and 32 are in communication with the oil passage means 22 and 24; and the control ports of the valves 31 and 32 are in communication with the oil passage means 18 and 20.

In operation of said hydraulic manifold system 5, on the power stroke of the pair of work devices, hydraulic pressure oil is pumped from a hydraulic reservoir into said filter cavity means 36 via oil passage means 58 and 56 and is filtered in said filter cavity means 36 by the filter cartridge 46 therein. The filtered hydraulic liquid is then delivered out of said filter cavity means 36 by said interconnecting oil passage means 54 into said oil passageway 11 for said hydraulic circuit. The filtered hydraulic liquid delivered to said hydraulic circuit enters the oil passage means 13, 14 and 16; passes through the inlet and control ports of the control valves 31 and 32; and through oil passage means 18 and 20 to the pressure ports of the pair of work devices. On the return stroke of the pair of work devices the return hydraulic liquid from the exhaust ports of the pair of work devices is directed by the oil passage means 18 and 20 through the control and outlet ports of the control valves 31 and 32 into the oil passage means 22 and 24 and thence back to the reservoir through the oil passage means 15 and 17 and through the manifold outlet 26. Whenever the pressure drop across the filter cavity means 36 exceeds a predetermined value, as when the filter cartridge 46 therein needs changing from being clogged by foreign matter, the by-pass valve means 60 operates by unseating of the valve spool 65 from the valve seat 64 to place the unfiltered hydraulic oil zone of said filter cavity means 36 in communication with said interconnecting oil passage means 54 to by-pass the clogged filter cartridge 46. Said by-pass valve means 60 is ordinarily factory pre-set to open when the pressure drop across the filter cavity 36 is of the order of 400 lbs. per square inch.

Figure 5:
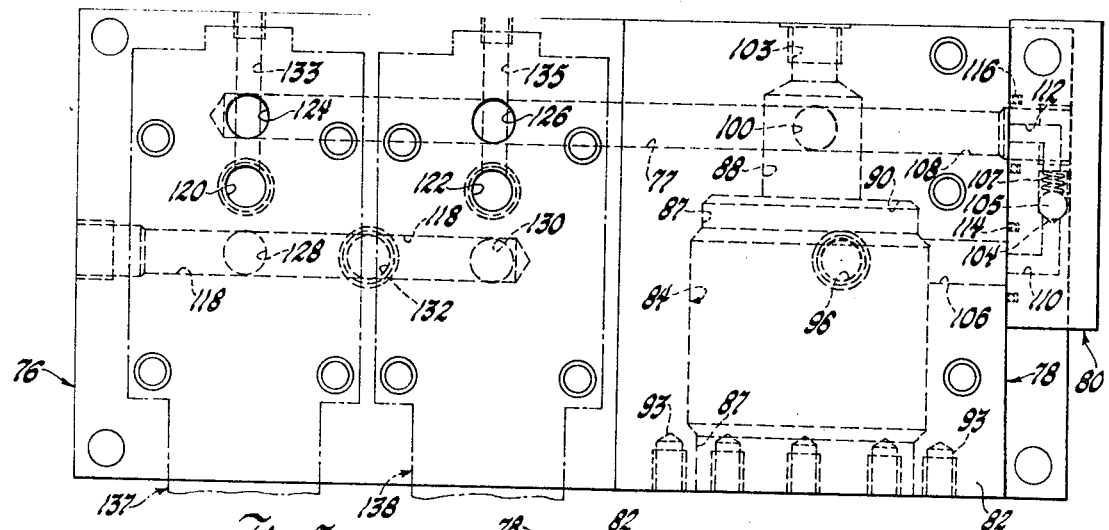
FIG. 5 is a top plan view of another hydraulic manifold system embodying my invention.
Figure 6:
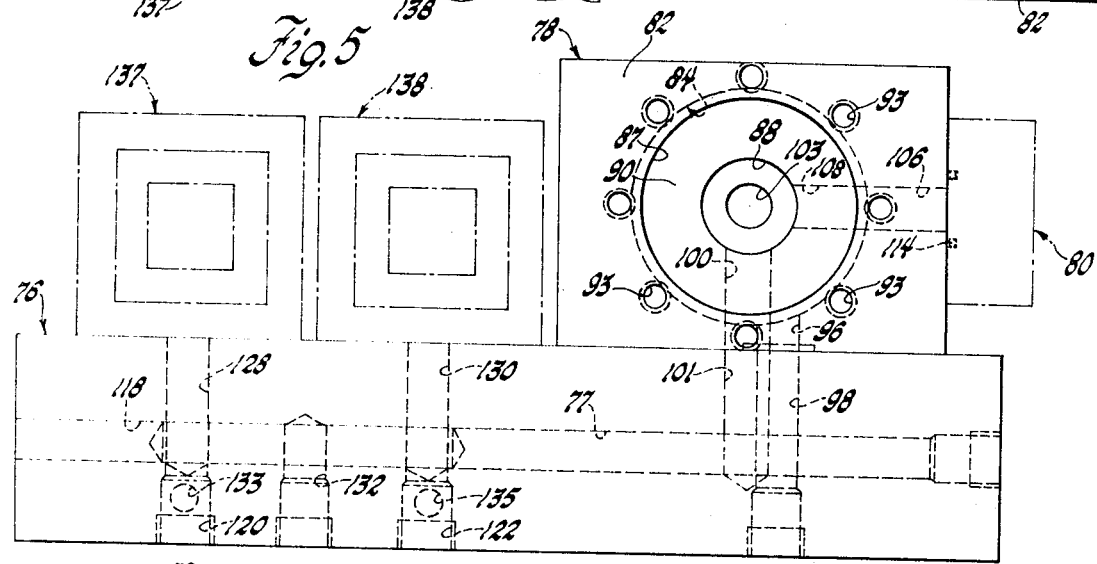
FIGS. 6 and 7 are, respectively, front and end elevational views of said other embodiment.
Figure 7:
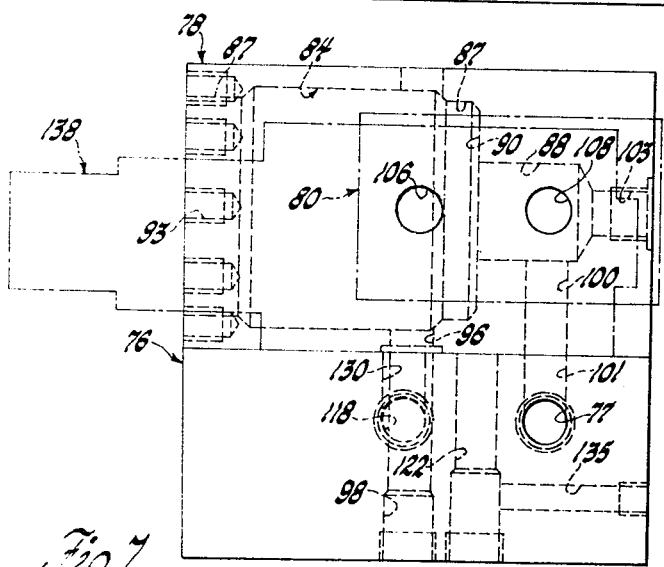

Referring to FIGS. 5–7, the hydraulic manifold system shown therein is designated 75 and comprises, in combination, a hydraulic manifold 76 having an oil directing hydraulic circuit therein commencing with oil passage means 77, oil filter means 78 for filtering hydraulic oil entering said hydraulic circuit, and by-pass valve means 80 (shown in solid line in FIG. 5 and in dash-dot lines in FIGS. 6 and 7) operative to by-pass the filtering action in the event of clogging thereof. Said hydraulic manifold 76, in the instance, is a drilled hydraulic manifold consisting of a solid metal block having intersecting oil passage means drilled therein. Said filter means 78 comprises metal body housing means 82 having filter cavity means, generally designated 84, therein. Said housing means 82 which, in the instance, is a separate housing from the hydraulic manifold 76, has opposite front and back faces and a side face to which said by-pass valve means 80 is bolted.

Said filter cavity means 84 has its axis transversely disposed in respect to the length of the hydraulic manifold 76 and opens to and extends inwardly from said front face of said housing means and is defined by concentric apertures 87 and 88 and the shoulder 90 between said apertures 87 and 88. Said filter cavity means 84 is constructed to seal against replaceable filter cartridge means, such as the filter cartridge means 41 shown in FIGS. 1–4, having a throwaway filter cartridge, such as the filter cartridge 46, disposed therein so as to divide said filter cavity means 84 into filtered and unfiltered hydraulic oil zones. Said filter cartridge means 41 carries O-ring seals 42 and 44 which are capable of sealing against the bore 87 as in the case of bore 37. The cartridge 46 is adapted to be spring pressed by spring means 48 against the shoulder 90 as in the case of the shoulder 40. The filter cartridge 46 is insertable into and removable from said filter cavity means 84 through said opening therefor flush with said front face of said housing means 82. Said front face of said housing means serves as a mounting means by which said filter cartridge means 41 may be bolted, as at 93, to said housing means 82. Said filter cavity means 84 and said housing means 82 have communicating entry port means by which hydraulic oil entering said housing means 82 enters said filter cavity means 84 before reaching said hydraulic circuit. In the instance, oil passage means 96 and 98 form entry port means for said filter cavity means 84 and for said housing means 82. Said filter cavity means 84 has exit port means consisting of the bore 88 and interconnecting oil passage means 100. The interconnecting oil passage means 100 communicates the filtered hydraulic oil zone of said filter cavity means 84 with said oil passage means 77 so that filtered hydraulic oil leaving said filter cavity means 84 enters said hydraulic circuit. Said filter means 78 comprises oil clean-out passage means 103 which is normally plugged at its outer end and opens to said rear face of said housing means 82 and serves as a means to back-wash the filter cartridge 46. Said filter means 78 also comprises by-pass oil passage means 106 and 108 which open to said side face of said housing means and communicate entry and exit port means 100 and 112 of said by-pass valve means 80, respectively, with the unfiltered hydraulic oil zone of said filter cavity means 84 and the exit port means of said filter cavity means 84 so that in the event of clogging of the filtering action unfiltered hydraulic oil in said filter cavity means 84 can by-pass the filter cartridge 46 and reach said interconnecting oil passage means 100 via said by-pass valve means 80.

Said by-pass valve means 80 includes a valve seat 104 and a moveable valve spool 105 (shown by convention as a ball) spring pressed, as by spring means 107, against said valve seat 104 and O-ring seals 114 and 116 for sealing, respectively, about said entry and exit port means 110 and 112 in respect to said side face of said housing means 82.

In constructing said hydraulic manifold system 75, the entire hydraulic circuit is drilled in said manifold 76. Said oil passage means 77 is drilled inwardly into the hydraulic manifold 76 from the entrance side thereof (corresponding to the location of the by-pass valve means 80) and oil passage means 118 is drilled inwardly into said hydraulic manifold 76 from the opposite side thereof. The oil passage means 77 and 118 are normally plugged at the outer ends thereof. Oil passage means 98, 120 and 122 are drilled clear through the hydraulic manifold 76 from the bottom to the top faces thereof; oil passage means 101, 124, 126 and 128, 130 are drilled inwardly from the top face of the hydraulic manifold 76 to intersect, respectively, with said oil passage means 77 and 118; oil passage means 132 is drilled inwardly from the bottom face of said hydraulic manifold to intersect with oil passage means 118; and oil passage means 133 and 135 are drilled inwardly from the back face of the hydraulic manifold so as to communicate, respectively, with said oil passage means 120 and 122. Said oil passage means 133 and 135 which are normally plugged at the outer ends thereof give access, e.g. for test purposes, to the hydraulic oil flowing between the hydraulic manifold and the pair of work devices.

Said filter cavity means 84, in the instance, is formed by machining said concentric apertures 87 and 88 inwardly from the front face of said housing means 82. The aperture 88 is made to intersect with said clean-out oil passage means 103 which is drilled inwardly from the back face of said housing means 82. Subsequent to forming said filter cavity means 84 oil passage means 106 and 108 are drilled inwardly from said side face of said housing means 82 to intersect, respectively, with said filter cavity means 84 and said concentric aperture 88 and interconnecting oil passage means 100 is drilled inwardly from the bottom face of said housing means to intersect with said concentric aperture 88. A pair of valves 137 and 138 shown in dash-dot lines are mounted on the top face of said hydraulic manifold 76 and control a pair of hydraulic work devices (not shown) remote from said hydraulic manifold system 75. The inlet ports of the valves 137 and 138 are in communication with the oil passage means 124 and 126; the outlet ports of the valves 137 and 138 are in communication with the oil passage means 128 and 130; and the control ports of the valves 137 and 138 are in communication with the oil passage means 120 and 122.

In operation of said hydraulic manifold system 75, on the power stroke of the pair of work devices hydraulic pressure oil is pumped from a hydraulic reservoir into said filter cavity means 84 via oil passage means 98 and 96 and is filtered in said filter cavity means 84 by a filter cartridge such as the filter cartridge 46 therein. The filtered hydraulic liquid is then delivered out of said filter cavity means 84 by said interconnecting oil passage means 100 into said oil passage means 101 and entrance oil passage means 77 for said hydraulic circuit. The filtered hydraulic liquid delivered to said hydraulic circuit enters the oil passage means 124 and 126; passes through the inlet and control ports of the control valves 137 and 138; and through oil passage means 120 and 122 to the pressure ports of the pair of work devices. On the return stroke of the pair of work devices the return hydraulic liquid from the exhaust ports of said pair of work devices is directed by the oil passage means 120 and 122 through the control and outlet ports of the control valves 137 and 138 into the oil passage means 128 and 130 and thence back to the reservoir through the oil passage means 118 and through the manifold outlet 132. Whenever the pressure drop across the filter cavity means 84 exceeds a predetermined value, as when the filter cartridge therein needs changing from being clogged by foreign matter, the by-pass valve means 80 operates by unseating of the valve spool 105 from the valve seat 104 to place the unfiltered hydraulic oil zone of said filter cavity means 84 in communication with said interconnecting oil passage means 100 to by-pass the clogged filter cartridge.

It will thus be seen that there has been provided by my invention a hydraulic manifold system in which the object hereinabove set forth together with many thoroughly practical advantages has been successfully achieved. My hydraulic manifold system provides a very compact and useful combination of elements by which all of the hydraulic oil entering a hydraulic manifold can be filtered on a continuous basis as said hydraulic oil flows through said hydraulic manifold. In the event of clogging of the filter means rather than starve the work devices of hydraulic oil, unfiltered hydraulic oil will by-pass said filtering action and flow through the hydraulic manifold via the by-pass valve means which is handily bolted to a side of the housing means for said filter means. While preferred embodiments of my invention has been shown and described it is to be understood that variations and changes may be resorted to without departing from the spirit of my invention as defined by the appended claims.

I claim:

1. A hydraulic manifold system comprising, in combination, a hydraulic manifold having a liquid-directing hydraulic circuit therein, liquid filter means associated with said hydraulic manifold for filtering hydraulic liquid entering a part of said hydraulic circuit, and by-pass means including a uni-directional check valve associated with said filter means operative upon clogging of the filtering action thereof, each said hydraulic manifold, filter means and by-pass means itself consisting of no pipes, said filter means comprising a filter cavity having inlet and outlet liquid passage means therefor and constructed to receive within itself and to seal against a replaceable liquid filter cartridge disposed in said filter cavity, said hydraulic manifold having means for mounting thereon at least one hydraulic liquid flow-control valve, said hydraulic circuit comprising inlet and outlet ports in said hydraulic manifold for hydraulic liquid, respectively entering and leaving the latter, a pair of control ports in said hydraulic manifold for said flow-control valve for hydraulic liquid, respectively, entering and leaving said flow-control valve, and liquid passage means for directing hydraulic liquid from said filter cavity outlet liquid passage means to one of said control ports and from the other of said control ports to said hydraulic manifold outlet port, said filter cavity inlet and outlet liquid passage means in communication, respectively, with said hydraulic manifold inlet port and said one control port, said check valve having inlet and outlet liquid passage means therefor in communication, respectively, with said filter cavity and said one control port and constructed to open in the event of clogging of the filtering action to by-pass hydraulic liquid around said filter cartridge from said hydraulic manifold inlet port through said check valve to said one control port.

2. A hydraulic manifold system as claimed in claim 1, said hydraulic manifold a brazed hydraulic manifold consisting of at least two plates brazed together face to face, at least a part of said hydraulic circuit consisting of liquid passage means cut in at least one of said plates prior to brazing of said hydraulic manifold.

3. A hydraulic manifold system as claimed in claim 1, said hydraulic manifold a drilled hydraulic manifold, said hydraulic circuit consisting of intersecting drilled liquid passage means in said hydraulic manifold.

4. A hydraulic manifold system as claimed in claim 1, said filter cavity formed inside of and integral with said hydraulic manifold, said by-pass valve means being in a housing mounted upon said hydraulic manifold, said hydraulic manifold inlet port communicating both with said filter cavity inlet liquid passage means and with said by-pass valve means inlet liquid passage means.

5. A hydraulic manifold system as claimed in claim 4, said hydraulic manifold a brazed hydraulic manifold consisting of at least two plates brazed together face to face, said filter cavity outlet liquid passage means comprising a liquid passage drilled in at least one of said plates prior to brazing of the manifold.

6. A hydraulic manifold system as claimed in claim 1, said filter cavity being in a housing mounted upon said hydraulic manifold, said by-pass valve means being in a housing mounted upon said housing for said filter cavity, said hydraulic manifold inlet port drilled in said hydraulic manifold from top to bottom faces thereof.

* * * * *